United States Patent
Yamaguchi (10) Patent No.: US 9,551,626 B2
(45) Date of Patent: Jan. 24, 2017

(54) LEAK TESTING METHOD

(71) Applicant: TOYOTA JIDOSHA KABUSHIKI KAISHA, Toyota-shi, Aichi (JP)

(72) Inventor: Tetsuya Yamaguchi, Nagoya (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 64 days.

(21) Appl. No.: 14/647,288

(22) PCT Filed: Nov. 7, 2013

(86) PCT No.: PCT/JP2013/080129
§ 371 (c)(1),
(2) Date: May 26, 2015

(87) PCT Pub. No.: WO2014/084017
PCT Pub. Date: Jun. 5, 2014

(65) Prior Publication Data
US 2015/0308918 A1   Oct. 29, 2015

(30) Foreign Application Priority Data

Nov. 30, 2012   (JP) .................. 2012 262486

(51) Int. Cl.
*G01M 3/26* (2006.01)
*G01M 3/02* (2006.01)
*G01M 3/32* (2006.01)

(52) U.S. Cl.
CPC ............... *G01M 3/26* (2013.01); *G01M 3/025* (2013.01); *G01M 3/3263* (2013.01)

(58) Field of Classification Search
CPC ....... G01M 3/26; G01M 3/025; G01M 3/3263
USPC .................................. 73/40.7, 49.7
See application file for complete search history.

(56) References Cited

FOREIGN PATENT DOCUMENTS

| JP | 2000-121485 A | 4/2000 | |
|---|---|---|---|
| JP | 2000121485 A | * 4/2000 | ............. G01M 3/26 |

* cited by examiner

*Primary Examiner* — Michael A Lyons
*Assistant Examiner* — Suman K Nath
(74) *Attorney, Agent, or Firm* — Andrews Kurth Kenyon LLP (57) ABSTRACT

Provided is a leak testing method of a workpiece including spaces which are three partitioned void portions, the leak testing method being capable of separately learning an amount of leakage from each of the spaces, and precisely determining whether the workpiece is normal or defective. The leak testing method includes steps of obtaining total leakage amounts, and a step of calculating, based on the obtained total leakage amounts, a first leakage amount, a second leakage amount, a third leakage amount, a fourth leakage amount, a fifth leakage amount and a sixth leakage amount which are amounts of leakage from respective routes when gas is injected to a workpiece at a predetermined pressure.

2 Claims, 6 Drawing Sheets

LEAK TESTING METHOD

CROSS-REFERENCE TO RELATED APPLICATIONS

This is a national phase application based on the PCT International Patent Application No. PCT/JP2013/080129 filed Nov. 7, 2013, claiming priority to Japanese Patent Application No. 2012-262486 filed Nov. 30, 2012, the entire contents of both of which are incorporated herein by reference.

TECHNICAL FIELD

The present invention relates to a technique for a leak testing method, specifically to a technique of quantitatively calculating a leakage amount of each of three partitioned void portions of a workpiece to precisely determine whether leakage occurs at each of the void portions or not.

BACKGROUND ART

For example, a cylinder block constituting an engine has a space (hereinafter referred to as "a first space") consisting of a crankcase in which a crankshaft is stored, cylinder bores and the like, a space (hereinafter referred to as "a second space") through which cooling water flows, and a space (hereinafter referred to as "a third space") through which engine oil flows.

In order to secure an engine function, a fluid flowing through each of these spaces formed in the cylinder block should not leak (causes leakage) to the other spaces.

However, if a cylinder block has a defect such as a blow hole, the blow hole forms a route which connects the spaces and therefore leakage may occur between the spaces and the outside.

Conventionally, a workpiece such as, typically, a cylinder block or a cylinder head including three partitioned void portions is inspected whether or not leakage occurs in the first to third spaces (i.e., a leak test is conducted), and then is supplied to a next process.

Moreover, various techniques of precisely conducting such a leak test are studied. For example, such a technique is disclosed in JP 2000-121485 A, and is publicly known.

The conventional technique disclosed in JP 2000-121485 A is configured to conduct a leak test of a workpiece including spaces of a plurality of systems (e.g., three systems), the leak test including calculating an alternative characteristic value of a flow path resistance based on a change in a flow rate and a change in a pressure in charging pressure, and evaluating this alternative characteristic value to determine whether leakage occurs or not.

CITATION LIST

Patent Literature

PTL1: JP 2000-121485 A

SUMMARY OF INVENTION

Technical Problem

However, the conventional technique disclosed in JP 2000-121485 A cannot separately learn what degree of leakage occurs from each space to which space, and cannot precisely learn an amount of the leakage.

Therefore, even if there is a little leakage in a workpiece, which does not cause a problem when a pressure working on each space or a pressure difference is taken into account, the workpiece may be determined to be defective and discarded in spite of having no problem in terms of actual use.

The present invention has been made in light of the current situation as described above. The object of the present invention is to provide a leak testing method of a workpiece including spaces which are three partitioned void portions, the leak testing method being capable of separately learning an amount of leakage from each of the spaces, and precisely determining whether the workpiece is normal or defective.

Solution to Problem

The problem to be solved by the present invention is as described above. Next, means for solving the problem will be described.

A first aspect of the invention is a leak testing method for performing a leak test of a workpiece including a first space, a second space and a third space which are three partitioned void portions, and being likely to include a first external connection route which connects the first space to the outside, a second external connection route which connects the second space to the outside, a third external connection route which connects the third space to the outside, a first internal connection route which connects the first space and the second space, a second internal connection route which connects the second space and the third space, and a third internal connection route which connects the third space and the first space. The leak testing method includes: a first step of injecting a gas to the first space at a predetermined pressure, and obtaining a first total leakage amount which is a total amount of the gas leaking from the first internal connection route, the third internal connection route and the first external connection route; a second step of injecting the gas to the second space at a predetermined pressure, and obtaining a second total leakage amount which is a total amount of the gas leaking from the first internal connection route, the second internal connection route and the second external connection route; a third step of injecting the gas to the third space at a predetermined pressure, and obtaining a third total leakage amount which is a total amount of the gas leaking from the second internal connection route, the third internal connection route and the third external connection route; a fourth step of injecting the gas to the first space, the second space and the third space at a predetermined pressure, and obtaining a fourth total leakage amount which is a total amount of the gas leaking from the first external connection route, the second external connection route and the third external connection route; a fifth step of injecting the gas to the first space and the third space at a predetermined pressure, and obtaining a fifth total leakage amount which is a total amount of the gas leaking from the first external connection route, the third external connection route, the first internal connection route and the second internal connection route; a sixth step of injecting the gas to the first space and the second space at a predetermined pressure, and obtaining a sixth total leakage amount which is a total amount of the gas leaking from the first external connection route, the second external connection route, the second internal connection route and the third internal connection route; a step of calculating, based on the obtained first to sixth total leakage amounts, first to sixth leakage amounts which are amounts of leakage from the first external connection route, the second external connection route, the third external connection route, the first internal connection route, the second internal connection route and the third internal connection route respectively when the gas is injected to the workpiece at a predetermined pressure; and a step of determining whether the workpiece is normal or defective based on the calculated first to sixth leakage amounts.

A second aspect of the invention is a leak testing method for performing a leak test of a workpiece including a first space, a second space and a third space which are three partitioned void portions, and being likely to include a first external connection route which connects the first space to the outside, a second external connection route which connects the second space to the outside, a third external connection route which connects the third space to the outside, a first internal connection route which connects the first space and the second space, a second internal connection route which connects the second space and the third space, and a third internal connection route which connects the third space and the first space. The leak testing method includes: a first step of injecting a gas to the first space at a predetermined pressure, and obtaining a first total leakage amount which is a total amount of the gas leaking from the first internal connection route, the third internal connection route and the first external connection route; a second step of injecting the gas to the second space at a predetermined pressure, and obtaining a second total leakage amount which is a total amount of the gas leaking from the first internal connection route, the second internal connection route and the second external connection route; a third step of injecting the gas to the third space at a predetermined pressure, and obtaining a third total leakage amount which is a total amount of the gas leaking from the second internal connection route, the third internal connection route and the third external connection route; a first determining step of determining whether the workpiece is normal or defective after the first to third steps are performed, based on the obtained first to third total leakage amounts; a fourth step of inserting the gas to the first space, the second space and the third space at a predetermined pressure and obtaining a fourth total leakage amount which is a total amount of the gas leaking from the first external connection route, the second external connection route and the third external connection route; a fifth step of injecting the gas to the first space and the third space at a predetermined pressure, and obtaining a fifth total leakage amount which is a total amount of the gas leaking from the first external connection route, the third external connection route, the first internal connection route and the second internal connection route; a sixth step of injecting the gas to the first space and the second space at a predetermined pressure, and obtaining a sixth total leakage amount which is a total amount of the gas leaking from the first external connection route, the second external connection route, the second internal connection route and the third internal connection route; a calculating step of calculating, based on the obtained first to sixth total leakage amounts, first to sixth leakage amounts which are amounts of leakage from the first external connection route, the second external connection route, the third external connection route, the first internal connection route, the second internal connection route and the third internal connection route respectively when the gas is injected to the workpiece at a predetermined pressure; and a second determining step of determining whether the workpiece is normal or defective based on the calculated first to sixth leakage amounts. In the first determining step, when it is determined that the workpiece is normal, the leak test is finished. In the first determining step, when it is not determined that the workpiece is normal, the fourth to sixth steps, the calculating step and the second determining step are performed.

Advantageous Effects of Invention

The present invention provides the following effect.

According to the first aspect of the present invention, it is possible to separately and precisely leakage amounts between partitioned spaces and leakage amounts from the spaces to the outside.

Consequently, it is possible to improve precision of a leak test to determine whether a workpiece is normal or defective, and to reduce the quantity of workpieces which are determined to be defective even though the workpieces are normal.

According to the second aspect of the present invention, it is possible to prevent increase in time required for the leak test.

BRIEF DESCRIPTION OF DRAWINGS

FIGS. 3A and 3B are schematic views showing a situation that the leak testing method according to the first embodiment of the present invention is carried out.

FIGS. 4A and 4B are schematic views showing a situation that the leak testing method according to the first embodiment of the present invention is carried out.

FIGS. 5A and 5B are schematic views showing a situation that the leak testing method according to the first embodiment of the present invention is carried out.

DESCRIPTION OF EMBODIMENTS

Embodiments of the present invention will be described.

First, an entire configuration of an inspecting device which is used for a leak testing method according to one embodiment of the present invention will be described with reference to FIG. 1.

Figure 1:
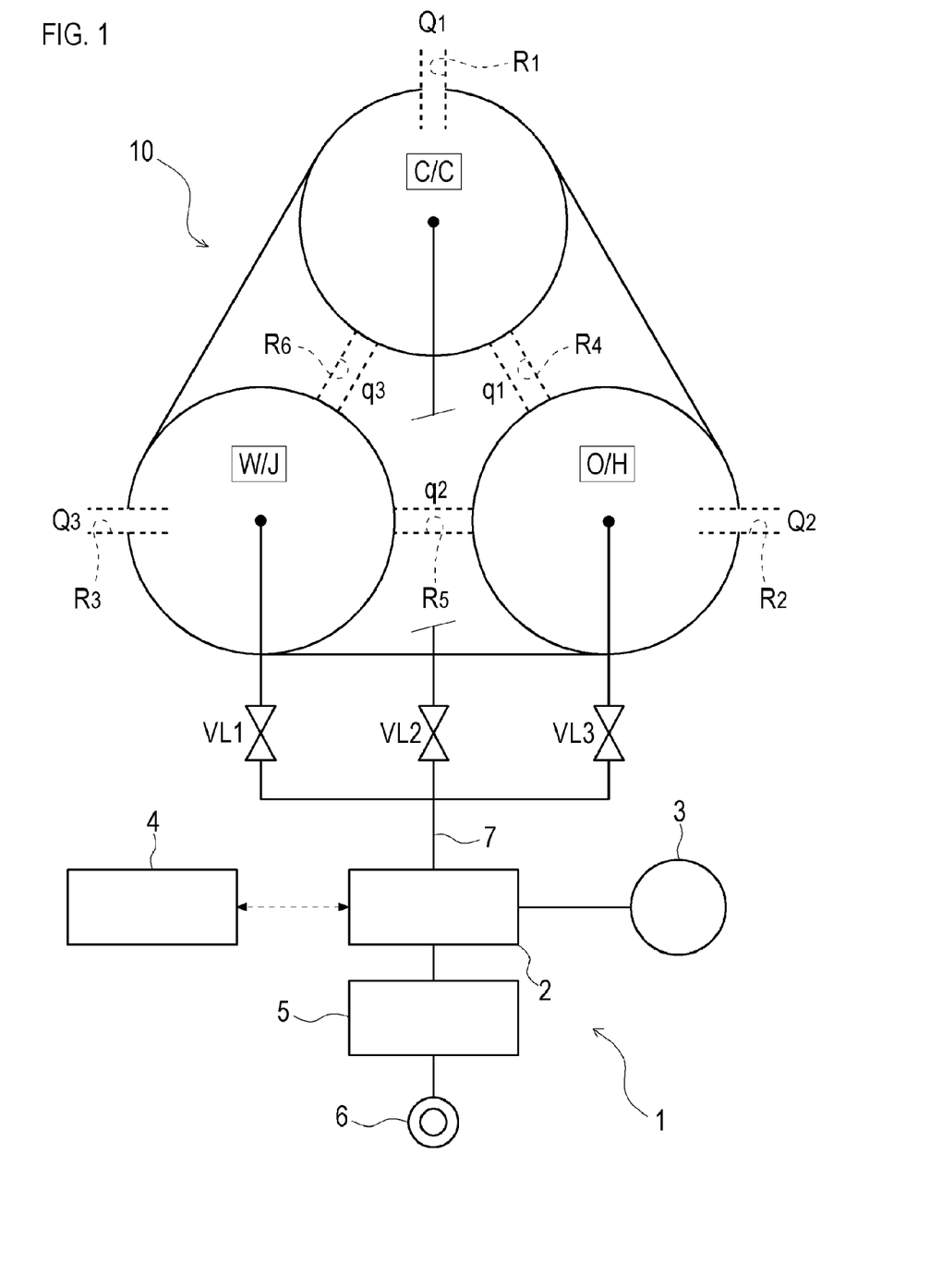
FIG. 1 shows a schematic view showing an entire configuration of an inspecting device which is used for a leak testing method according to one embodiment of the present invention.

As shown in FIG. 1, an inspecting device 1 used for the leak testing method according to one embodiment of the present invention inspects whether or not there are routes which cause leakage in three void portions formed in a workpiece 10 as an inspection object, the routes connecting the void portions with each other or connecting the void portions to the outside. The inspecting device 1 is configured to include a leak tester 2, a calculating device 4 and the like.

The leak tester 2 is a differential pressure detecting type, and has a master 3.

The master 3 is configured to generate a reference voltage and is guaranteed not to cause leakage. The leak tester 2 detects a difference between a pressure in the master 3 and a pressure in the workpiece 10, thus enabling to detect whether leakage in the workpiece 10 occurs or not, an amount of leakage from the workpiece 10 at the pressure.

The leak tester 2 according to the present embodiment is configured to adopt air as a fluid used to detect a differential pressure. The leak tester 2 is connected to an air pipe 6 which is an air supply source, through a pressure regulating valve 5.

In the present embodiment, a case is described, where a differential-pressure-type leak tester is adopted as a leak tester which detects whether leakage occurs in the spaces or not. However, the configuration of the leak tester constituting the inspecting device according to the present invention is not limited thereto.

Further, in the present embodiment, a case where a fluid used for a leak tester is air is described. However, the specifications of the leak tester used for the leak testing method according to the present invention are not limited thereto. A leak tester which uses helium or other inert gas may be used for the leak tester.

The calculating device 4 determines whether leakage occurs in the spaces or not, and calculates an amount of leakage from each space, based on a measurement result of the leak tester 2. The calculating device 4 is connected with the leak tester 2.

A general-purpose personal computer in which a predetermined calculation program installed may be used as the calculating device 4, the personal computer having calculating means (CPU), storage means (a ROM or a RAM) and external storage means (HDD).

Next, a situation that a leak test is conducted by the leak testing method according to a first embodiment of the present invention will be described with reference to FIGS. 1 to 5.

In the first embodiment of the present invention, a case where the inspecting device 1 is used to conduct a leak test of the workpiece 10 shown in FIG. 1 will be described.

The workpiece 10 shown in FIG. 1 schematically indicates a cylinder block constituting an engine.

The workpiece 10 described herein has a series of spaces (referred to as C/C below) which are formed by a crankcase, cylinder bores and a chain case as a first space, a circulation route (referred to as O/H below) of engine oil as a second space, and a circulation route (referred to as W/J below) of cooling water as a third space.

Further, a defect such as a blow hole is likely to cause formation of a first route $R_1$ which connects C/C to the outside, a second route $R_2$ which connects O/H to the outside, and a third route $R_3$ which connects W/J to the outside in the workpiece 10.

Furthermore, a defect such as a blow hole is likely to cause formation of a fourth route $R_4$ which connects C/C and O/H, a fifth route $R_5$ which connects O/H and W/J, and a sixth route $R_6$ which connects W/J and C/C in the workpiece 10.

Still further, as shown in FIG. 1, an amount of leakage from the first route $R_1$ will be defined as an external leakage amount $Q_1$, an amount of leakage from the second route $R_2$ will be defined as an external leakage amount $Q_2$, and an amount of leakage from the third route $R_3$ will be defined as an external leakage amount $Q_3$ below.

Moreover, as shown in FIG. 1, an amount of leakage from the fourth route $R_4$ will be defined as an internal leakage amount $q_1$, an amount of leakage from the fifth route $R_5$ will be defined as an internal leakage amount $q_2$, and an amount of leakage from the sixth route $R_6$ will be defined as an internal leakage amount $q_3$ below.

Figure 2:
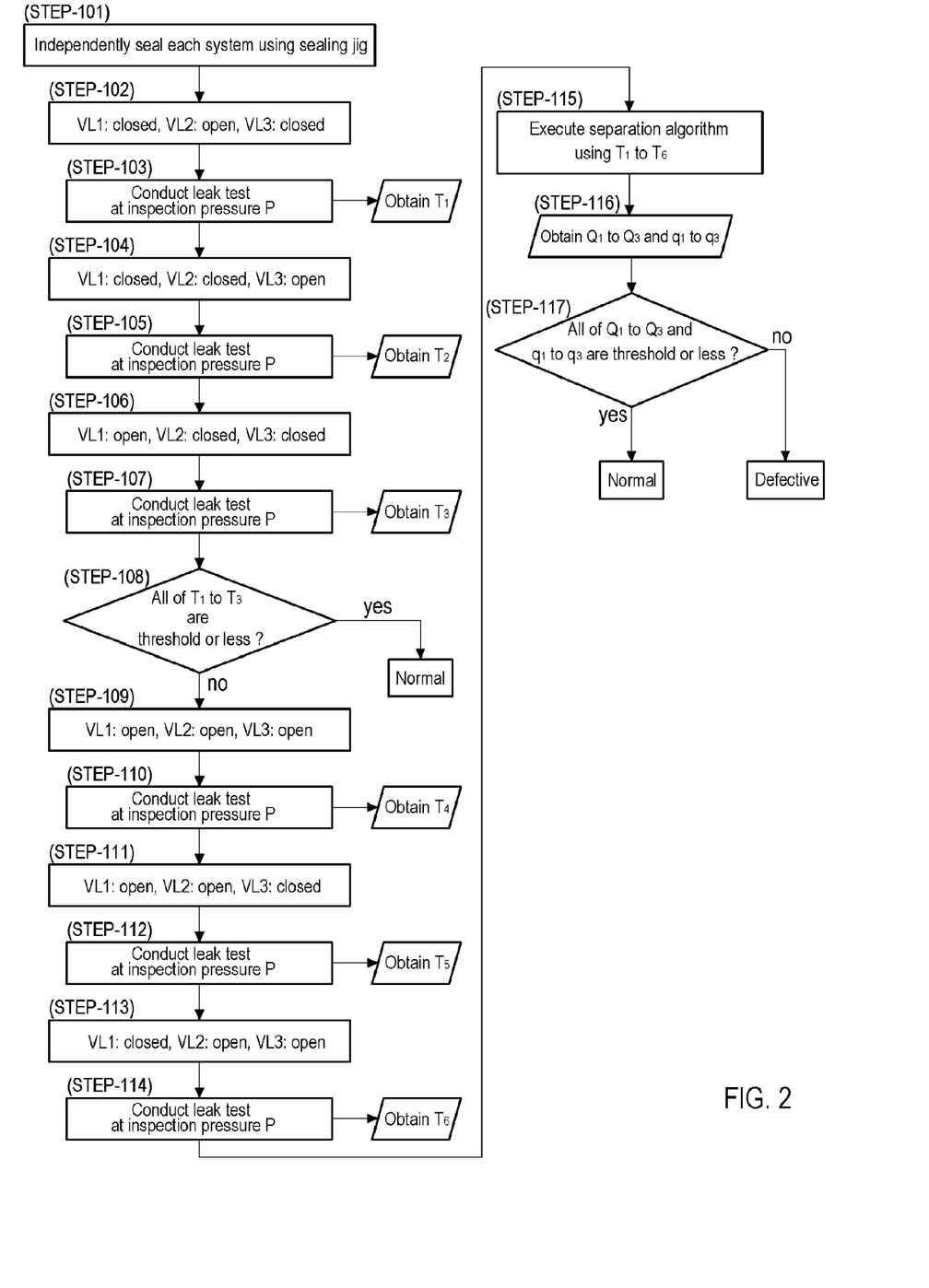
FIG. 2 shows a flowchart showing a flow of the leak testing method according to a first embodiment of the present invention.

As shown in FIG. 2, in the leak testing method according to the first embodiment of the present invention, first, opening portions other than connection ports which supply necessary gas for a leak test are sealed by using sealing jig (not shown) (STEP-101).

By so doing, the workpiece 10 is prepared such that gas used for the leak test does not leak from the opening portions blocked by using the sealing jigs.

Further, the workpiece 10 is connected to the leak tester 2.

In this regard, pipe 7 connected with the leak tester 2 are branched into three systems, and valves are provided to the respective pipes 7 of the branched systems.

As shown in FIG. 1, W/J is connected with the pipe 7 of the system including a first valve (described as VL1 below), C/C is connected with the pipe 7 of the system including a second valve (described as VL2 below), and O/H is connected with the pipe 7 of the system including a third valve (described as VL3 below).

Figure 3A:
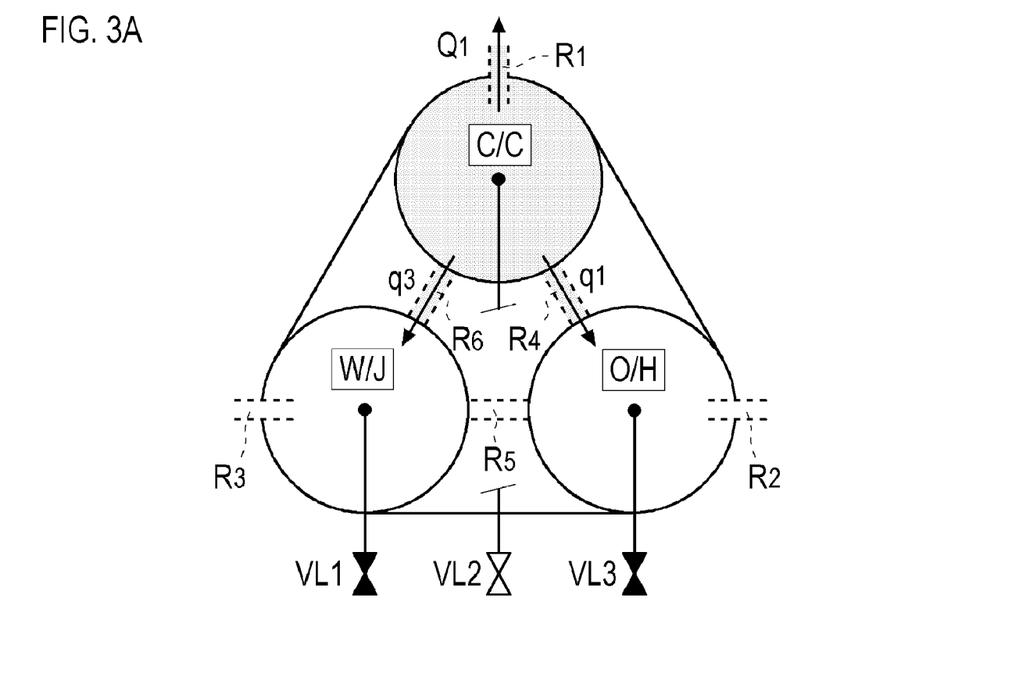
FIG. 3A is a schematic view showing a situation that a first total leakage amount $T_1$ is obtained.

Next, in the leak testing method according to the first embodiment of the present invention, only VL2 is "opened" and VL1 and VL3 are "closed" as shown in FIGS. 2 and 3A (STEP-102).

Further, in this state, gas is supplied to C/C at a predetermined pressure P, and the leak tester 2 measures a total leakage amount $T_1$ of air leaking from C/C (STEP-103).

Furthermore, information of the measured total leakage amount $T_1$ is sent to the calculating device 4, and is stored in the calculating device 4.

The measured total leakage amount $T_1$ is an amount expressed by following equation 1, and is an amount obtained by adding the external leakage amount $Q_1$ leaking from C/C to the outside through the route $R_1$, the internal leakage amount $q_1$ leaking from C/C to O/H through the route $R_4$, and the internal leakage amount $q_3$ leaking from C/C to W/J through the route $R_6$.

$$T_1 = Q_1 + q_1 + q_3 \qquad \text{[Math. 1]}$$

Figure 3B:
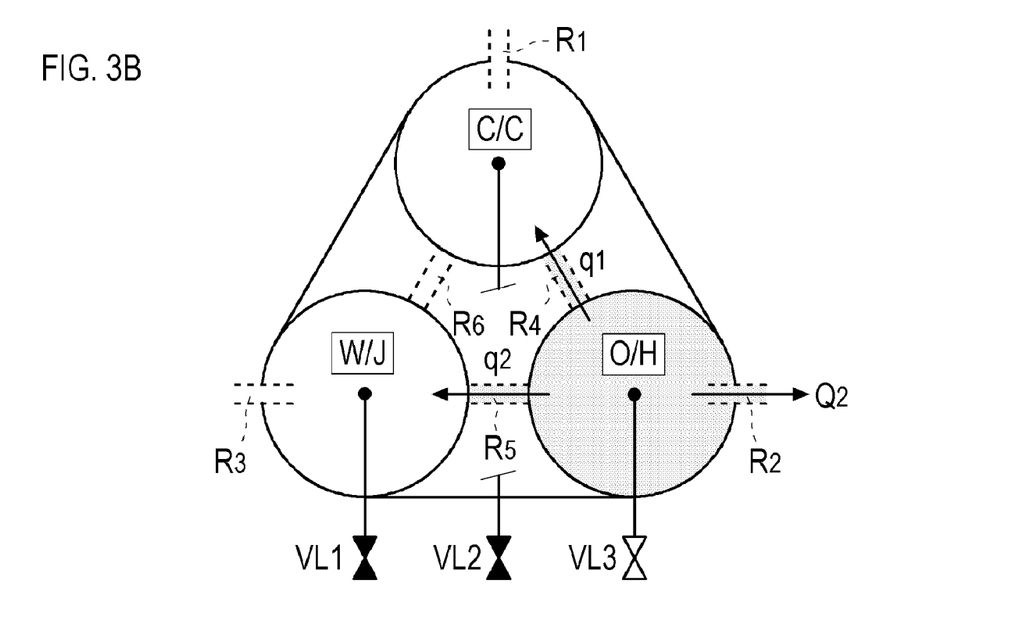
FIG. 3B is a schematic view showing a situation that a second total leakage amount $T_2$ is obtained.

Next, in the leak testing method according to the first embodiment of the present invention, only VL3 is "opened" and VL1 and VL2 are "closed" as shown in FIGS. 2 and 3B (STEP-104).

Further, in this state, gas is supplied to O/H at the predetermined pressure P, and the leak tester 2 measures a total leakage amount $T_2$ of air leaking from O/H (STEP-105).

Furthermore, information of the measured total leakage amount $T_2$ is sent to the calculating device 4, and is stored in the calculating device 4.

The measured total leakage amount $T_2$ is an amount expressed by following equation 2, and is an amount obtained by adding the external leakage amount $Q_2$ leaking from O/H to the outside through the route $R_2$, the internal leakage amount $q_1$ leaking from O/H to C/C through the route $R_4$, and the internal leakage amount $q_2$ leaking from O/H to W/J through the route $R_5$.

$$T_2 = Q_2 + q_1 + q_2 \qquad \text{[Math. 2]}$$

Figure 4A:
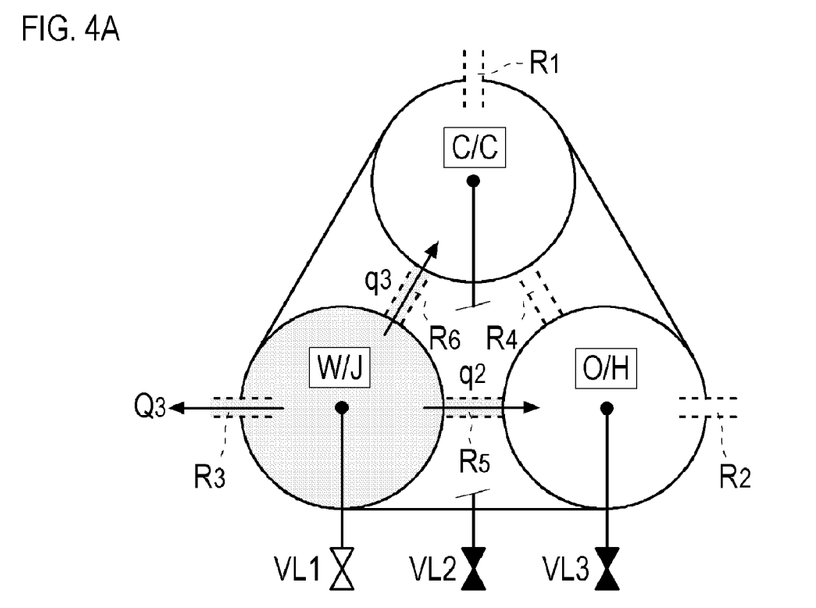
FIG. 4A is a schematic view showing a situation that a third total leakage amount $T_3$ is obtained.

Next, in the leak testing method according to the first embodiment of the present invention, only VL1 is "opened" and VL2 and VL3 are "closed" as shown in FIGS. 2 and 4A (STEP-106).

Further, in this state, gas is supplied to W/J at the predetermined pressure P, and the leak tester 2 measures a total leakage amount $T_3$ of air leaking from W/J (STEP-107).

Furthermore, information of the measured total leakage amount $T_3$ is sent to the calculating device 4, and is stored in the calculating device 4.

The measured total leakage amount $T_3$ is an amount expressed by following equation 3, and is an amount obtained by adding the external leakage amount $Q_3$ leaking from W/J to the outside through the route $R_3$, the internal leakage amount $q_2$ leaking from W/J to O/H through the route $R_5$, and the internal leakage amount $q_3$ leaking from W/J to C/C through the route $R_6$.

$$T_3 = Q_3 + q_2 + q_3 \qquad \text{[Math. 3]}$$

Further, in the leak testing method according to the first embodiment of the present invention, the calculating device 4 determines whether the workpiece 10 is normal or defective, based on the total leakage amounts $T_1$ to $T_3$ measured so far (STEP-108).

In this regard, when all of the total leakage amounts $T_1$ to $T_3$ are a threshold or less, the workpiece 10 is determined to be normal and the leak test is then finished.

Meanwhile, when there is a total leakage amount which exceeds the threshold among the total leakage amounts $T_1$ to $T_3$, the leak test is further continued.

Figure 4B:
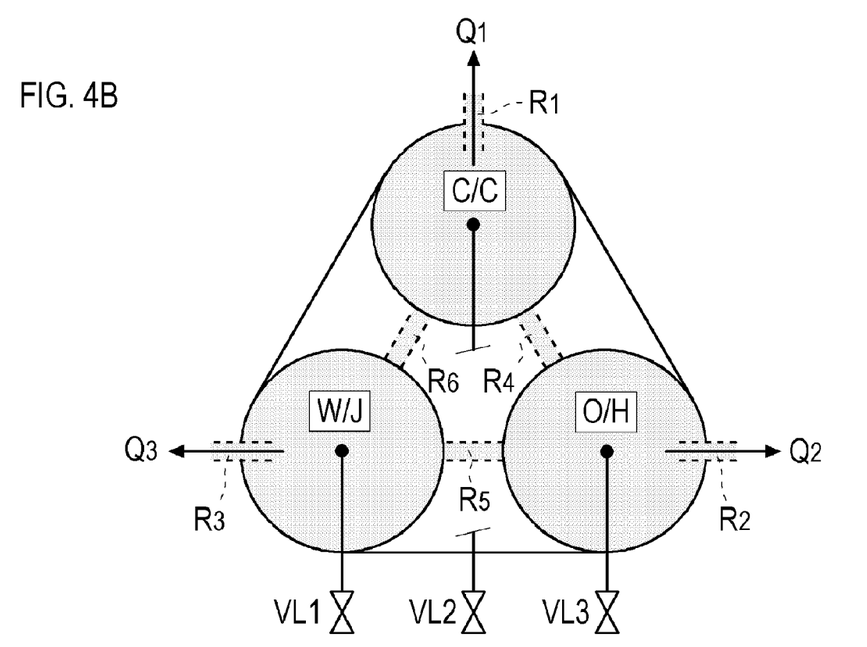
FIG. 4B is a schematic view showing a situation that a fourth total leakage amount $T_4$ is obtained.

Next, in the leak testing method according to the first embodiment of the present invention, when the workpiece 10 is not determined to be normal in above (STEP-108), all valves (VL1 to VL3) are "opened" as shown in FIGS. 2 and 4B (STEP-109).

Further, in this state, gas is supplied to each of the spaces (C/C, O/H and W/J) at the predetermined pressure P, and the leak tester 2 measures a total leakage amount $T_4$ of air leaking from the workpiece 10 (STEP-110).

Furthermore, information of the measured total leakage amount $T_4$ is sent to the calculating device 4, and is stored in the calculating device 4.

The measured total leakage amount $T_4$ is an amount expressed by following equation 4, and is an amount obtained by adding the external leakage amount $Q_1$ leaking from C/C to the outside of the workpiece 10 through the route $R_1$, the external leakage amount $Q_2$ leaking from O/H to the outside of the workpiece 10 through the route $R_2$, and the external leakage amount $Q_3$ leaking from W/J to the outside of the workpiece 10 through the route $R_3$.

$$T_4 = Q_1 + Q_2 + Q_3 \qquad \text{[Math. 4]}$$

Figure 5A:
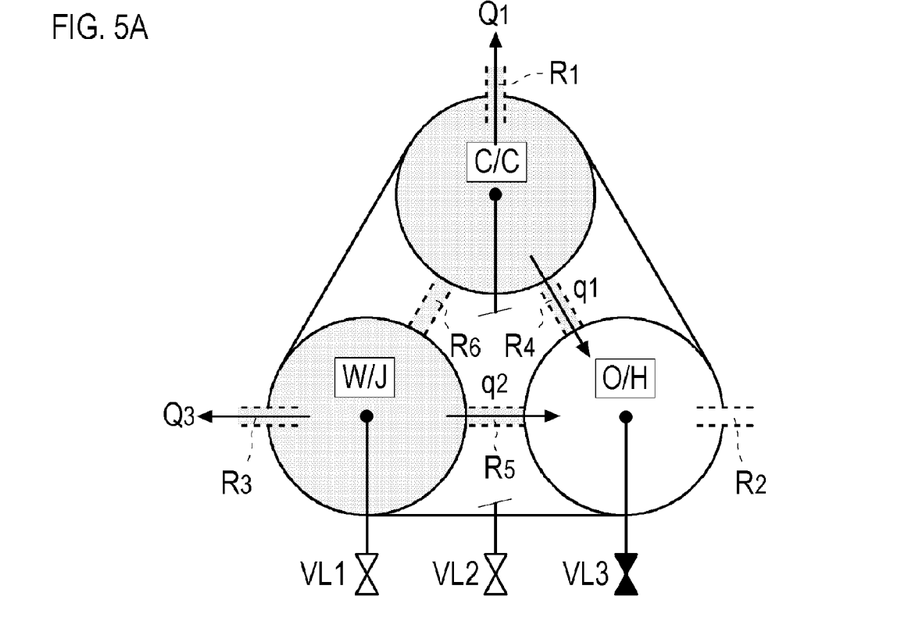
FIG. 5A is a schematic view showing a situation that a fifth total leakage amount $T_5$ is obtained.

Next, in the leak testing method according to the first embodiment of the present invention, only VL3 is "closed" and VL1 and VL2 are "opened" as shown in FIGS. 2 and 5A (STEP-111).

Further, in this state, gas is supplied to C/C and W/J at the predetermined pressure P, and the leak tester 2 measures a total leakage amount $T_5$ (STEP-112).

Furthermore, information of the measured total leakage amount $T_5$ is sent to the calculating device 4, and is stored in the calculating device 4.

The measured total leakage amount $T_5$ is an amount expressed by following equation 5, and is an amount obtained by adding the external leakage amount $Q_1$ leaking from C/C to the outside of the workpiece 10 through the route $R_1$, the external leakage amount $Q_3$ leaking from W/J to the outside of the workpiece 10 through the route $R_3$, the internal leakage amount $q_1$ leaking from C/C to O/H through the route $R_4$ and the internal leakage amount $q_2$ leaking from W/J to O/H through the route $R_5$.

$$T_5 = Q_1 + Q_3 + q_1 + q_2 \qquad \text{[Math. 5]}$$

Figure 5B:
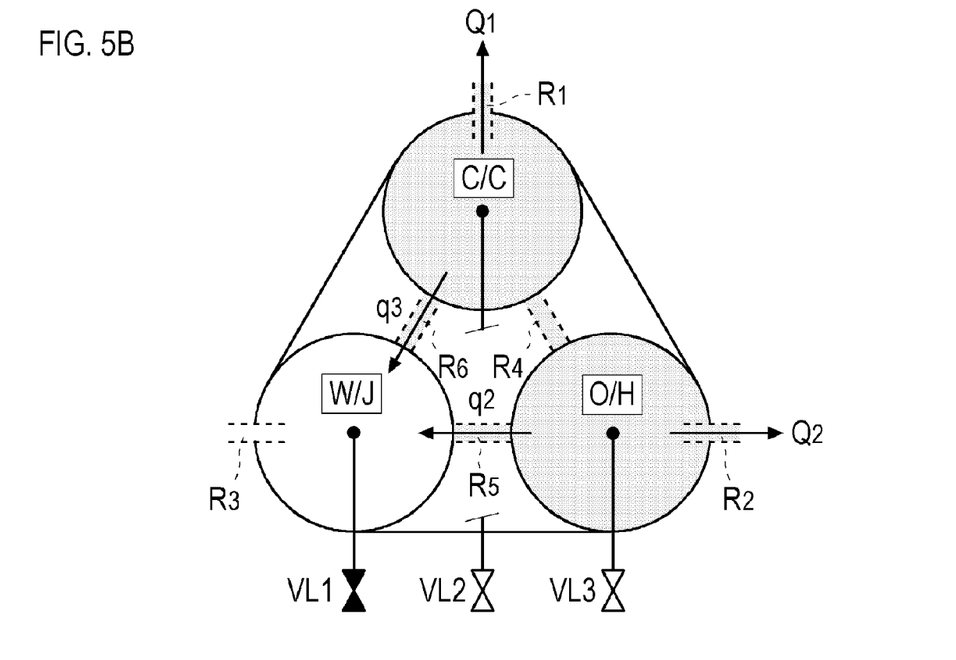
FIG. 5B is a schematic view showing a situation that a sixth total leakage amount $T_6$ is obtained.

Next, in the leak testing method according to the first embodiment of the present invention, only VL1 is "closed" and VL2 and VL3 are "opened" as shown in FIGS. 2 and 5B (STEP-113).

Further, in this state, gas is supplied to C/C and O/H at the predetermined pressure P, and the leak tester 2 measures a total leakage amount $T_6$ (STEP-114).

Furthermore, information of the measured total leakage amount $T_6$ is sent to the calculating device 4, and is stored in the calculating device 4.

The measured total leakage amount $T_6$ is an amount expressed by following equation 6, and is an amount obtained by adding the external leakage amount $Q_1$ leaking from C/C to the outside of the workpiece 10 through the route $R_1$, the external leakage amount $Q_2$ leaking from O/H to the outside of the workpiece 10 through the route $R_2$, the internal leakage amount $q_2$ leaking from O/H to W/J through the route $R_5$ and the internal leakage amount $q_3$ leaking from C/C to W/J through the route $R_6$.

$$T_6 = Q_1 + Q_2 + q_2 + q_3 \qquad \text{[Math. 6]}$$

Further, in the leak testing method according to the first embodiment of the present invention, as shown in FIG. 2, the calculating device 4 calculates the leakage amounts $Q_1$, $Q_2$, $Q_3$, $q_1$, $q_2$ and $q_3$ based on the total leakage amounts $T_1$ to $T_6$ measured so far in accordance with the following separation algorithm (STEP-115).

Hereinafter, the separation algorithm for the leakage amounts ($Q_1$, $Q_2$, $Q_3$, $q_1$, $q_2$ and $q_3$) adopted by the leak testing method according to the first embodiment of the present invention will be described.

The separation algorithm described later is introduced in advance in the calculating device 4, and the calculating device 4 separately calculates the leakage amounts ($Q_1$, $Q_2$, $Q_3$, $q_1$, $q_2$ and $q_3$) based on measurement results (i.e., the total leakage amounts $T_1$ to $T_6$) of the leak tester 2.

In the separation algorithm of the leak testing method according to the first embodiment of the present invention, as expressed in following equation 7, a total sum of the measured total leakage amounts $T_1$ to $T_3$ is defined as $S_{Qq}$. The calculating device 4 calculates the total sum $S_{Qq}$ of the total leakage amounts $T_1$ to $T_3$.

$$\sum_{i=1}^{3} T_i \equiv S_{Qq} \qquad \text{[Math. 7]}$$

Further, in the separation algorithm of the leak testing method according to the first embodiment of the present invention, as expressed in equation 8, a total sum (i.e., $q_1 + q_2 + q_3$) of the internal leakage amounts is defined as $S_q$. Further, the calculating device 4 calculates the total sum $S_q$ of the internal leakage amounts.

$$\frac{S_{Qq} - T_4}{2} = q_1 + q_2 + q_3 \equiv S_q \qquad \text{[Math. 8]}$$

Next, the calculating device 4 calculates the internal leakage amount $q_3$ of the route $R_6$ based on following equation 9.

$$\frac{S_{Qq} - (T_2 + T_5)}{2} = q_3 \qquad \text{[Math. 9]}$$

Next, the calculating device 4 calculates the internal leakage amount $q_1$ of the route $R_4$ based on following equation 10.

$$\frac{S_{Qq} - (T_3 + T_6)}{2} = q_1 \qquad \text{[Math. 10]}$$

Next, the calculating device 4 calculates the internal leakage amount $q_2$ of the route $R_5$ based on following equation 11.

$$S_q - q_3 - q_1 = q_2 \qquad \text{[Math. 11]}$$

Next, the calculating device 4 calculates the external leakage amount $Q_1$ of the route $R_1$ based on following equation 12.

$$T_1 - q_1 - q_3 = Q_1 \qquad \text{[Math. 12]}$$

Next, the calculating device 4 calculates the external leakage amount $Q_2$ of the route $R_2$ based on following equation 13.

$$T_2 - q_1 - q_2 = Q_2 \qquad \text{[Math. 13]}$$

Next, the calculating device 4 calculates the external leakage amount $Q_3$ of the route $R_3$ based on following equation 14.

$$T_3 - q_2 - q_3 = Q_3 \qquad \text{[Math. 14]}$$

The leak testing method according to the first embodiment of the present invention adopts the separation algorithm, so that the calculating device 4 can quantitatively calculate the leakage amounts $Q_1$, $Q_2$, $Q_3$, $q_1$, $q_2$ and $q_3$ (STEP-116).

Further, the calculating device 4 determines whether the workpiece 10 is normal or defective based on the calculated leakage amounts $Q_1$, $Q_2$, $Q_3$, $q_1$, $q_2$ and $q_3$ (STEP-117)

In this regard, the calculating device 4 is configured to determine that the workpiece 10 is normal when all of the calculated leakage amounts $Q_1$, $Q_2$, $Q_3$, $q_1$, $q_2$ and $q_3$ are a predetermined threshold or less, and determine that the workpiece 10 is defective when even one of the leakage amounts exceeds the threshold.

The spaces C/C, O/H and W/J in the workpiece 10 differ from each other in having different fluids flowing therethrough, and having different internal pressures in a working state.

In a general cylinder block, internal pressures in a working state are higher in order of O/H, W/J and C/C.

Hence, it is desirable that thresholds of the leakage amounts $Q_1$, $Q_2$, $Q_3$, $q_1$, $q_2$ and $q_3$ used for determining whether the workpiece 10 is normal or defective are separately set. However, conventionally, the leakage amounts $Q_1$, $Q_2$, $Q_3$, $q_1$, $q_2$ and $q_3$ could not be quantitatively calculated, and therefore it was not possible to adequately determine whether the workpiece is normal or defective taking into account a pressure difference in a working state.

On the other hand, in the leak testing method according to the first embodiment of the present invention, it is possible to quantitatively calculate the leakage amounts $Q_1$, $Q_2$, $Q_3$, $q_1$, $q_2$ and $q_3$ in the workpiece 10, and adequately determine whether the workpiece is normal or defective taking into account a pressure difference in a working state, based on the calculated leakage amounts $Q_1$, $Q_2$, $Q_3$, $q_1$, $q_2$ and $q_3$.

That is, the leak testing method according to the first embodiment of the present invention can adequately determine that the workpiece which is conventionally determined to be defective in spite of no problem in terms of use is normal and reduce disposal cost of workpieces and, as a result, contribute to reduction in manufacturing cost of workpieces such as cylinder blocks and improvement in manufacturing efficiency.

The leak testing method according to the first embodiment of the present invention is the leak testing method of the workpiece 10 including the first space (C/C), the second space (O/H) and the third space (W/J) which are the three partitioned void portions, and being likely to include a route $R_1$ which is a first external connection route connecting C/C to the outside, a route $R_2$ which is a second external connection route connecting O/H to the outside, a route $R_3$ which is a third external connection route connecting W/J to the outside, a route $R_4$ which is a first internal connection route connecting C/C and O/H, a route $R_5$ which is a second internal connection route connecting O/H and W/J, a route $R_6$ which is a third internal connection route connecting W/J and C/C, the leak testing method including: a first step (STEP-103) of injecting the gas to C/C at the predetermined pressure P, and obtaining the first total leakage amount $T_1$ which is a total amount (i.e., $Q_1 + q_1 + q_3$) of the gas leaking from the route $R_1$, the route $R_4$ and the route $R_6$; a second step (STEP-105) of injecting the gas to O/H at the predetermined pressure P, and obtaining the second total leakage amount $T_2$ which is a total amount (i.e., $Q_2 + q_1 + q_2$) of the gas leaking from the route $R_2$, the route $R_4$ and the route $R_5$; a third step (STEP-107) of injecting the gas to W/J at the predetermined pressure P, and obtaining the third total leakage amount $T_3$ which is a total amount (i.e., $Q_3 + q_2 + q_3$) of the gas leaking from the route $R_3$, the route $R_5$ and the route $R_6$; a fourth step (STEP-110) of injecting the gas to C/C, O/H and W/J at the predetermined pressure P, and obtaining the fourth total leakage amount $T_4$ which is a total amount (i.e., $Q_1 + Q_2 + Q_3$) of the gas leaking from the route $R_1$, the route $R_2$ and the route $R_3$; a fifth step (STEP-112) of injecting gas to C/C and W/J at the predetermined pressure P, and obtaining the fifth total leakage amount $T_5$ which is a total amount (i.e., $Q_1 + Q_3 + q_1 + q_2$) of the gas leaking from the route $R_1$, the route $R_3$, the route $R_4$ and the route $R_5$; a fifth step (STEP-114) of injecting the gas to C/C and O/H at the predetermined pressure P, and obtaining the sixth total leakage amount $T_6$ which is a total amount (i.e., $Q_1 + Q_2 + q_2 + q_3$) of the gas leaking from the route $R_1$, the route $R_2$, the route $R_5$ and the route $R_6$; a step (STEP-116) of calculating, based on obtained $T_1$ to $T_6$, a first leakage amount (external leakage amount $Q_1$), a second leakage amount (external leakage amount $Q_2$), a third leakage amount (external leakage amount $Q_3$), a fourth leakage amount (internal leakage amount $q_1$), a fifth leakage amount (internal leakage amount $q_2$) and a sixth leakage amount (internal leakage amount $q_3$) which are amounts of leakage from the routes $R_1$, $R_2$, $R_3$, $R_4$, $R_5$ and $R_6$ respectively when the gas is injected to a workpiece 10 at the predetermined pressure P; and a step (STEP-117) of determining whether the workpiece 10 is normal or defective based on the calculated first to sixth leakage amounts (i.e., the leakage amounts $Q_1$, $Q_2$, $Q_3$, $q_1$, $q_2$ and $q_3$).

According to this configuration, it is possible to separately and precisely learn the internal leakage amounts $q_1$, $q_2$ and $q_3$ between the partitioned spaces (C/C, O/H and W/J) and the external leakage amounts $Q_1$, $Q_2$ and $Q_3$ from the spaces (C/C, O/H and W/J).

Consequently, it is possible to improve precision of a leak test to determine whether the workpiece is normal or defective, and reduce the quantity of workpieces 10 which are determined to be defective even though the workpieces 10 are normal.

Further, in the leak testing method according to the first embodiment of the present invention, a first determining step (STEP-108) is performed after the first step (STEP-103), the second step (STEP-105) and the third step (STEP-107), including determining whether the workpiece 10 is normal or defective based on the obtained first to third total leakage amounts $T_1$ to $T_3$. In the first determining step (STEP-108), when it is determined that the workpiece 10 is normal, the leak test is finished. When it is not determined that the workpiece 10 is normal, the following steps are performed: the fourth step (STEP-110), the fifth step (STEP-112), the sixth step (STEP-114), a step (STEP-116) of calculating, based on the obtained first to sixth total leakage amounts $T_1$ to $T_6$, the first to sixth leakage amounts $Q_1$, $Q_2$, $Q_3$, $q_1$, $q_2$ and $q_3$ when the gas is injected to the workpiece 10 at the predetermined pressure P, and a step (STEP-117) of determining whether the workpiece 10 is normal or defective based on the calculated leakage amounts $Q_1$, $Q_2$, $Q_3$, $q_1$, $q_2$ and $q_3$.

The leak testing method according to the first embodiment of the present invention is adopted to enable adequate determination regarding whether leakage occurs or not; therefore, this configuration prevents the increase in time required for the leak test.

Next, a situation that a leak test is conducted by a leak testing method according to a second embodiment of the present invention will be described with reference to FIG. 6.

As described above, the spaces (C/C, O/H and W/J) in the workpiece 10 according to the present embodiment differ from each other in having different fluids flowing therethrough, and having different internal pressures in a working state.

Hence, it is desirable to apply a test pressure corresponding to the internal pressure of the respective spaces (C/C, O/H and W/J) in the working state to the spaces.

Hereinafter, in the second embodiment of the present invention shown below, the leak testing method of applying different test pressure to the spaces (C/C, O/H and W/J) will be described.

The leak testing method according to this second embodiment can be realized using an inspecting device 1 which is the same as that of the leak testing method according to the above first embodiment of the present invention.

Further, a workpiece which is an inspection object in the second embodiment is the same as the workpiece 10 described in the first embodiment.

Figure 6:
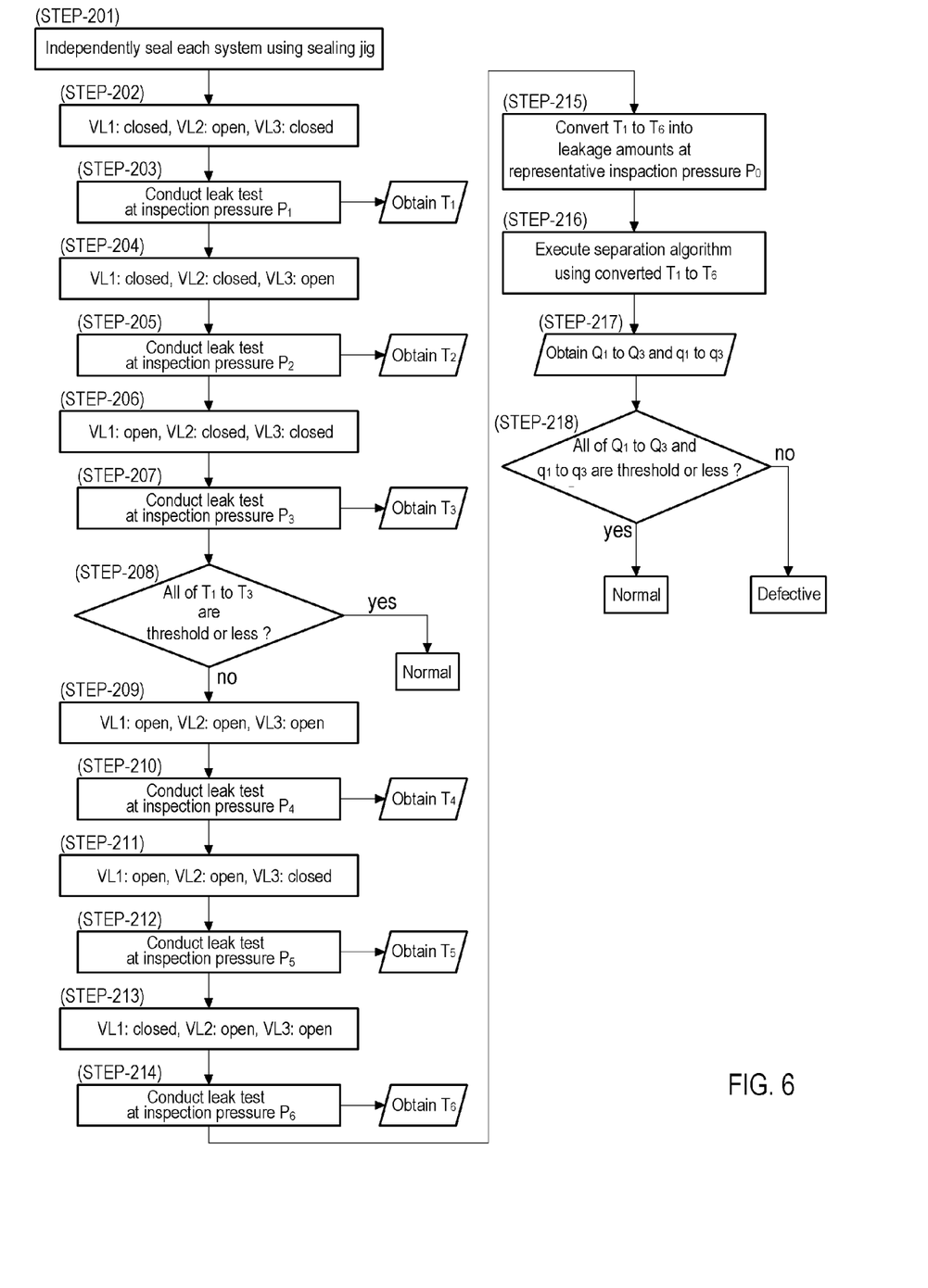
FIG. 6 shows a flowchart showing a flow of the leak testing method (of changing an inspection pressure per space) according to a second embodiment of the present invention.

As shown in FIG. 6, in the leak testing method according to the second embodiment of the present invention, first, opening portions other than connection ports which supply necessary gas for a leak test are sealed by using sealing jig (not shown) (STEP-201).

By so doing, the workpiece 10 is prepared such that gas used for the leak test does not leak from the opening portions blocked by using the sealing jigs.

Further, the workpiece 10 is connected to a leak tester 2.

Next, in the leak testing method according to the second embodiment of the present invention, only VL2 is "opened" and VL1 and VL3 are "closed" as shown in FIGS. 6 and 3A (STEP-202).

Further, in this state, gas is supplied at a predetermined pressure $P_1$ corresponding to the internal pressure in the working state (working pressure) of C/C, and the leak tester 2 measures a total leakage amount $T_1$ of air leaking from C/C (STEP-203).

Furthermore, information of the measured total leakage amount $T_1$ is sent to the calculating device 4, and is stored in the calculating device 4.

This measured total leakage amount $T_1$ is the amount expressed by the above-described equation 1.

Next, in the leak testing method according to the second embodiment of the present invention, only VL3 is "opened" and VL1 and VL2 are "closed" as shown in FIGS. 6 and 3B (STEP-204).

Further, in this state, gas is supplied at a predetermined pressure $P_2$ corresponding to the working pressure of O/H, and the leak tester 2 measures a total leakage amount $T_2$ of air leaking from O/H (STEP-205).

Furthermore, information of the measured total leakage amount $T_2$ is sent to the calculating device 4, and is stored in the calculating device 4.

This measured total leakage amount $T_2$ is the amount expressed by the above-described equation 2.

Next, in the leak testing method according to the second embodiment of the present invention, only VL1 is "opened" and VL2 and VL3 are "closed" as shown in FIGS. 6 and 4A (STEP-206).

Further, in this state, gas is supplied at a predetermined pressure $P_3$ corresponding to the working pressure of W/J, and the leak tester 2 measures a total leakage amount $T_3$ of air leaking from W/J (STEP-207).

Furthermore, information of the measured total leakage amount $T_3$ is sent to the calculating device 4, and is stored in the calculating device 4.

This measured total leakage amount $T_3$ is the amount expressed by the above-described equation 3.

Further, in the leak testing method according to the second embodiment of the present invention, the calculating device 4 determines whether the workpiece 10 is normal or defective, based on the total leakage amounts $T_1$ to $T_3$ measured so far (STEP-208).

In this regard, when all of the total leakage amounts $T_1$ to $T_3$ are a threshold or less, the workpiece 10 is determined to be normal and the leak test is then finished.

Meanwhile, when there is a total leakage amount which exceeds the threshold among the total leakage amounts $T_1$ to $T_3$, the leak test is further continued.

Next, in the leak testing method according to the second embodiment of the present invention, when the workpiece 10 is not determined to be normal in above (STEP-208), all valves (VL1 to VL3) are "opened" as shown in FIGS. 6 and 4B (STEP-209).

Further, in this state, gas is supplied to each of the spaces (C/C, O/H and W/J) at the predetermined pressure $P_4$, and the leak tester 2 measures a total leakage amount $T_4$ of air leaking from the workpiece 10 (STEP-210).

Furthermore, information of the measured total leakage amount $T_4$ is sent to the calculating device 4, and is stored in the calculating device 4.

This measured total leakage amount $T_4$ is the amount expressed by the above-described equation 4.

Further, the predetermined pressure $P_4$ in this case desirably corresponds to the working pressure of a space whose working pressure is the highest among the spaces (C/C, O/H and W/J). In the case of the present embodiment, the pressure $P_4$ is set based on the working pressure of O/H.

Next, in the leak testing method according to the second embodiment of the present invention, only VL3 is "closed" and VL1 and VL2 are "opened" as shown in FIGS. 6 and 5A (STEP-211).

Further, in this state, gas is supplied to C/C and W/J at a predetermined pressure $P_5$, and the leak tester 2 measures a total leakage amount $T_5$ (STEP-212).

Furthermore, information of the measured total leakage amount $T_5$ is sent to the calculating device 4, and is stored in the calculating device 4.

This measured total leakage amount $T_5$ is the amount expressed by the above-described equation 5.

Further, the predetermined pressure $P_5$ in this case desirably corresponds to the working pressure of a space whose working pressure is the highest between C/C and W/J. In the case of the present embodiment, the pressure $P_5$ is set based on the working pressure of W/J.

Next, in the leak testing method according to the second embodiment of the present invention, only VL1 is "closed" and VL2 and VL3 are "opened" as shown in FIGS. 6 and 5B (STEP-213).

Further, in this state, gas is supplied to C/C and O/H at a predetermined pressure $P_6$, and the leak tester 2 measures a total leakage amount $T_6$ (STEP-214).

Furthermore, information of the measured total leakage amount $T_6$ is sent to the calculating device 4, and is stored in the calculating device 4.

This measured total leakage amount $T_6$ is the amount expressed by the above-described equation 6.

Further, the predetermined pressure $P_6$ in this case desirably corresponds to the working pressure of a space whose working pressure is the highest between C/C and O/H. In the case of the present embodiment, the pressure $P_6$ is set based on the working pressure of O/H.

Further, in the leak testing method according to the second embodiment of the present invention, as shown in FIG. 6, the calculating device 4 converts the total leakage amounts $T_1$ to $T_6$ measured so far into the total leakage amounts at a representative inspection pressure $P_0$ (STEP-215).

Furthermore, the calculating device 4 calculates the leakage amounts $Q_1$, $Q_2$, $Q_3$, $q_1$, $q_2$ and $q_3$ based on the total leakage amounts $T_1$ to $T_6$ which has been converted into the leakage amounts at the representative inspection pressure $P_0$, in accordance with the following separation algorithm (STEP-216).

The representative inspection pressure $P_0$ in this case desirably corresponds to the working pressure of a space whose working pressure is the highest among the spaces (C/C, O/H and W/J). In the case of the present embodiment, the representative inspection pressure $P_0$ is set based on the working pressure of O/H.

The separation algorithm of the leak testing method according to the second embodiment of the present invention is the same as the separation algorithm of the leak testing method according to the first embodiment of the present invention. The calculating device 4 quantitatively calculates the leakage amounts $Q_1$, $Q_2$, $Q_3$, $q_1$, $q_2$ and $q_3$ based on above equation 7 to equation 14 (STEP-217).

Further, the calculating device 4 determines whether the workpiece 10 is normal or defective based on the calculated leakage amounts $Q_1$, $Q_2$, $Q_3$, $q_1$, $q_2$ and $q_3$ (STEP-218).

As described above, the leak testing method according to the second embodiment of the present invention makes it possible to quantitatively calculate the leakage amounts $Q_1$, $Q_2$, $Q_3$, $q_1$, $q_2$ and $q_3$ in the workpiece 10 taking into account a pressure in a working state, and more adequately determine whether the workpiece is normal or defective.

INDUSTRIAL APPLICABILITY

The present invention is widely applicable not only to workpieces such as, typically, cylinder blocks or cylinder heads which configure an engine, but also to workpieces including three partitioned void portions. Further, by putting the present invention into practice, it is possible to easily and precisely conduct leak tests of workpieces including four or more partitioned void portions.

What is claimed is:

1. A leak testing method for performing a leak test of a workpiece including a first space, a second space and a third space which are three partitioned void portions, and being likely to include a first external connection route which connects the first space to the outside, a second external connection route which connects the second space to the outside, a third external connection route which connects the third space to the outside, a first internal connection route which connects the first space and the second space, a second internal connection route which connects the second space and the third space, and a third internal connection route which connects the third space and the first space, the leak testing method comprising:

a first step of injecting a gas to the first space at a predetermined pressure, and obtaining a first total leakage amount which is a total amount of the gas leaking from the first internal connection route, the third internal connection route and the first external connection route;

a second step of injecting the gas to the second space at a predetermined pressure, and obtaining a second total leakage amount which is a total amount of the gas leaking from the first internal connection route, the second internal connection route and the second external connection route;

a third step of injecting the gas to the third space at a predetermined pressure, and obtaining a third total leakage amount which is a total amount of the gas leaking from the second internal connection route, the third internal connection route and the third external connection route;

a fourth step of injecting the gas to the first space, the second space and the third space at a predetermined pressure, and obtaining a fourth total leakage amount which is a total amount of the gas leaking from the first external connection route, the second external connection route and the third external connection route;

a fifth step of injecting the gas to the first space and the third space at a predetermined pressure, and obtaining a fifth total leakage amount which is a total amount of the gas leaking from the first external connection route, the third external connection route, the first internal connection route and the second internal connection route;

a sixth step of injecting the gas to the first space and the second space at a predetermined pressure, and obtaining a sixth total leakage amount which is a total amount of the gas leaking from the first external connection route, the second external connection route, the second internal connection route and the third internal connection route;

a step of calculating, based on the obtained first to sixth total leakage amounts, first to sixth leakage amounts which are amounts of leakage from the first external connection route, the second external connection route, the third external connection route, the first internal connection route, the second internal connection route and the third internal connection route respectively when the gas is injected to the workpiece at a predetermined pressure; and a step of determining whether the workpiece is normal or defective based on the calculated first to sixth leakage amounts.

2. A leak testing method for performing a leak test of a workpiece including a first space, a second space and a third space which are three partitioned void portions, and being likely to include a first external connection route which connects the first space to the outside, a second external connection route which connects the second space to the outside, a third external connection route which connects the third space to the outside, a first internal connection route which connects the first space and the second space, a second internal connection route which connects the second space and the third space, and a third internal connection route which connects the third space and the first space, the leak testing method comprising:

a first step of injecting a gas to the first space at a predetermined pressure, and obtaining a first total leakage amount which is a total amount of the gas leaking from the first internal connection route, the third internal connection route and the first external connection route;

a second step of injecting the gas to the second space at a predetermined pressure, and obtaining a second total leakage amount which is a total amount of the gas leaking from the first internal connection route, the second internal connection route and the second external connection route;

a third step of injecting the gas to the third space at a predetermined pressure, and obtaining a third total leakage amount which is a total amount of the gas leaking from the second internal connection route, the third internal connection route and the third external connection route;

a first determining step of determining whether the workpiece is normal or defective after the first to third steps are performed, based on the obtained first to third total leakage amounts;

a fourth step of inserting the gas to the first space, the second space and the third space at a predetermined pressure and obtaining a fourth total leakage amount which is a total amount of the gas leaking from the first external connection route, the second external connection route and the third external connection route;

a fifth step of injecting the gas to the first space and the third space at a predetermined pressure, and obtaining a fifth total leakage amount which is a total amount of the gas leaking from the first external connection route, the third external connection route, the first internal connection route and the second internal connection route;

a sixth step of injecting the gas to the first space and the second space at a predetermined pressure, and obtaining a sixth total leakage amount which is a total amount of the gas leaking from the first external connection route, the second external connection route, the second internal connection route and the third internal connection route;

a calculating step of calculating, based on the obtained first to sixth total leakage amounts, first to sixth leakage amounts which are amounts of leakage from the first external connection route, the second external connection route, the third external connection route, the first internal connection route, the second internal connection route and the third internal connection route respectively when the gas is injected to the workpiece at a predetermined pressure; and a second determining step of determining whether the workpiece is normal or defective based on the calculated first to sixth leakage amounts, wherein in the first determining step, when it is determined that the workpiece is normal, the leak test is finished, and in the first determining step, when it is not determined that the workpiece is normal, the fourth to sixth steps, the calculating step and the second determining step are performed.

* * * * *